July 31, 1934.   W. L. KNAPTON   1,968,606
TIRE REPAIR PATCH
Filed April 4, 1932
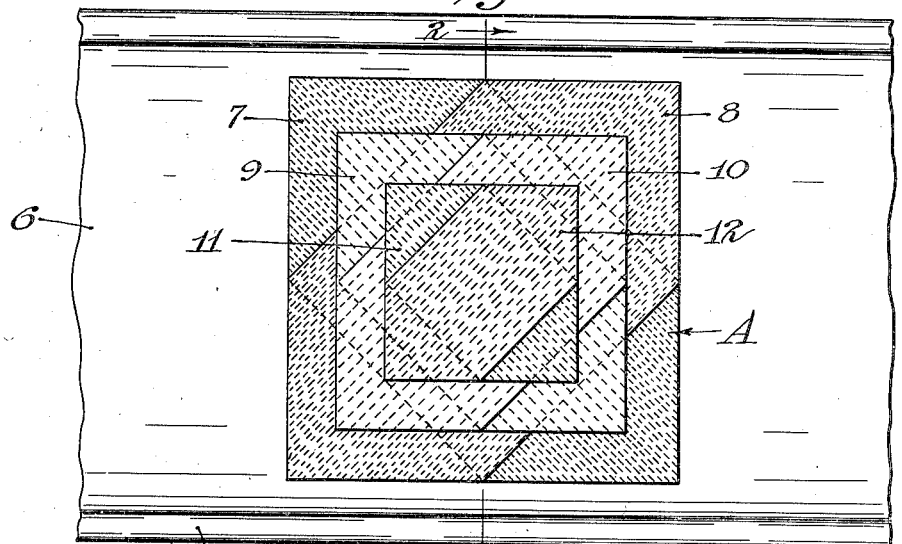
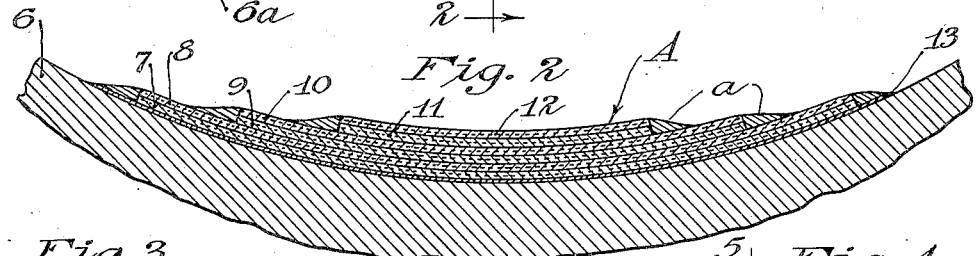
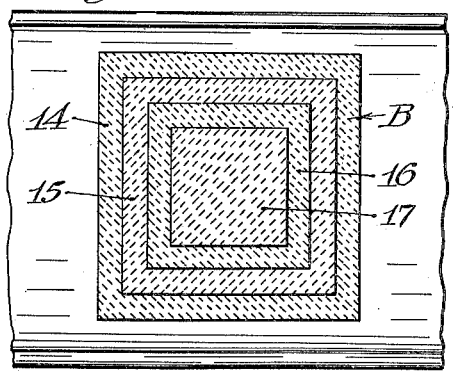
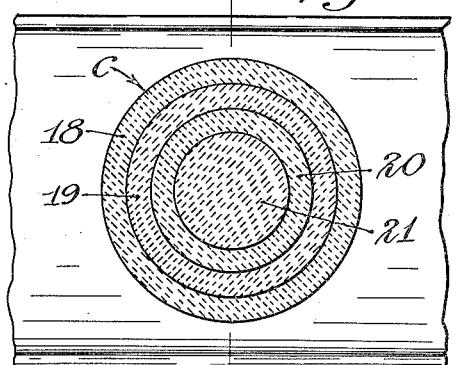
Inventor
Walter L. Knapton
By his Attorneys
Williamson & Williamson Patented July 31, 1934

1,968,606

UNITED STATES PATENT OFFICE 1,968,606

TIRE REPAIR PATCH

Walter L. Knapton, St. Paul, Minn., assignor of one-sixth to Frank J. Collins and one-sixth to Ralph E. Williamson, both of Minneapolis, Minn.

Application April 4, 1932, Serial No. 602,965

2 Claims. (Cl. 152—26)

This invention relates to repair patches for pneumatic tire casings.

The tire repair patch most commonly in use today is similar in most respects to the socalled "tire blow-out patch" disclosed in the Robert F. Reeve Patent No. 1,608,234, issued November 23, 1926. This patch includes a plurality of sheets of corded rubber superimposed one on top of the other to form a patch of the desired thickness. Adjacent sheets of the corded rubber have cords which run in opposite directions and the adjacent sheets of rubber are vulcanized together. The sheets used are of different sizes and the lowermost sheet, i. e. the sheet which is disposed against the tire casing is of the smallest size, while from bottom to top of the patch the sheets are of succeedingly larger size. The edges of sheets overlying lower sheets are carried out beyond the edges of the lower sheets and are applied directly to the tire casing. As a result, every sheet of the patch with the exception of the lowermost sheet is slightly deformed adjacent its edges relative to the true curvature of the tire casing. As a result when the tire is in use, the lowermost sheet of the patch takes most of the strain imposed upon the patch or, at least, the lowermost sheet takes a greater strain than the individual sheets above the same. Instead of all of the sheets working together to take the strain imposed upon the patch, the lowermost sheet is overburdened and the cords of this sheet almost invariably break or yield to destroy the efficiency of the patch before the cords of the uppermost sheets break or yield. After the lowermost sheet has given way, the major portion of the strain imposed on the patch is placed on the sheet immediately above the lowermost sheet, whereupon this next uppermost sheet will yield and so on until all the sheets of the patch have given way and the patch is then no longer effective. Also in this type of patch, there is a hinge action which takes place in overlying sheets of the patch at points where the edges of these sheets project beyond the edges of underlying sheets. This causes the sheets to loosen from the tire casing and from the underlying sheets at these points, destroying the efficiency of the patch. Also in such patches, the effective area in the tire casing that may be covered by the patch is limited by the size of the lowermost sheet of the patch, i. e. the smallest sheet of the patch. The overlapping edges of the upper layers or sheets of the patch cannot be relied on to effectively cover a tear or rip in the tire casing. There is thus considerable wastage of material in the patch of the type described.

It is one of the main objects of the present invention to provide a novel and improved repair patch for tire casings including a plurality of successively overlying corded rubber sheets vulcanized together and wherein the strain imposed on the tire patch will be evenly distributed on the various sheets to prevent undue strain on any of the sheets and the consequent breaking of one sheet before the remaining sheets are broken.

It is another object to provide such a repair patch which will be economical in use and will have long life and wherein no hinge action can take place between portions of overlying and underlying sheets of the patch.

Yet another object is to provide a patch which will cover tears or rips in tire casings by use of a minimum quantity of the material forming the patch.

To these ends, generally stated, the invention consists in the novel parts and novel combinations of parts, hereinafter defined in the claims and described in the following specification, made in connection with the accompanying drawing, wherein like reference characters refer to the same or similar parts throughout the various views and, in which, Fig. 1 is a plan view of an embodiment of the patch of the present invention shown in applied position in a tire casing;

Fig. 2 is a transverse section taken on the line 2—2 of Fig. 1, as indicated by the arrows;

Fig. 3 is a plan view illustrating a second embodiment of the invention applied to a tire casing;

Fig. 4 is a plan view illustrating a third embodiment of the invention applied to a tire casing; and Fig. 5 is a transverse section taken on the line 5—5 of Fig. 4, as indicated by the arrows.

Referring to the drawing, and first to Figs. 1 and 2 thereof, there is shown a portion of a pneumatic tire casing 6 having the usual beaded edges 6a. In applied position within the tire casing 6, is a repair patch designated as an entirety by the letter A. The repair patch A includes a plurality of sheets of corded rubber applied one on top of another and vulcanized together. Although any desired number of these sheets may be used to build up the patch to the desired thickness, in the embodiment illustrated six sheets are shown, and each of these sheets is of hexagonal-shape. The different sheets are of maximum length between two diametrically opposite corners thereof and the cords of each sheet (indicated by dash lines) extend parallel to a line drawn between the said two diametrically opposite corners. The bottom sheet of the patch A, i. e. the sheet which lies next to the tire casing 6 when the patch is in applied position, is designated by the numeral 7, the sheet lying immediately above the bottom sheet is designated by the numeral 8, the sheet next above sheet 8 is designated by the numeral 9, the sheet next above sheet 9 is designated by the numeral 10, the sheet next above sheet 10, is designated by the numeral 11 and the top sheet is designated by the numeral 12. Applied to the bottom of the patch is a layer 13 of originally uncured rubber which is used for vulcanizing the patch to the tire casing 6. The lower sheet 7 when in applied position, will be disposed with its cords running diagonally relative to the beads 6a of the tire casing and preferably the cords of the sheet 7 will be disposed at right angles to the cords of the layer of the tire casing 6 against which the patch is applied. The sheet 8 may be of the same dimension as the lower sheet 7, but the cords of the sheet 8 will be disposed to run at right angles to the cords of the sheet 7. Triangular end wings of the sheet 8 overlap the sides of the lower sheet 7. The sheet 9 is of considerably smaller dimension than sheet 7 and is applied so that its cords run in the same direction as the cords of the sheet 7. The sheet 10 is preferably of the same size as the sheet 9 and the cords of the sheet 10 extend in the same direction as the sheet 8. The sheet 11 is of considerably smaller dimension than the sheet 9 and the cords of sheet 11 run in the same direction as sheets 7 and 9. Sheet 12 is of the same size as sheet 11 and the cords of sheet 12 run in the same direction as the cords of sheets 8 and 10. It will be seen that the cords of adjacent sheets of the patch A illustrated, from bottom to top of the same, run in opposite directions. In making up the patch A, preferably new corded rubber fabric will be used for the different sheets of the patch, although if desired, old corded rubber fabric taken from old tires may be used. The different sheets 7, 8, 9, 10, 11 and 12, if made of new corded fabric, will be superimposed one on top of another, whereupon cushion gum $a$ will be applied about the edges of the different sheets. Uncured rubber gum will then be applied to the bottom of the patch, whereupon the patch is ready for use in a tire casing. The patch will be applied over the break in the casing and will cover a break somewhat longer than the greatest over all length of the uppermost sheet 12. When the patch is in applied position within the casing, the patch may be vulcanized in the usual manner. If desired, the sheets may be vulcanized together before application of the patch to the tire casing, but in this case the uncured layer 13 of gum rubber will not be applied to the bottom of the patch until after the sheets of the patch have been vulcanized together. Also the sheets when vulcanized will be molded to conform in contour to the particular tire casing in connection with which the patch is to be used. Whether the patch is vulcanized before or after it is applied to the tire casing, as the patch is vulcanized the cushion gum $a$ will melt to form upwardly and outwardly bevelled edges for the different sheets of the patch, and to also prevent the ends of the cords from projecting beyond the edges of the vulcanized patch.

Referring now to Fig. 3, there is illustrated a second embodiment of the invention. The patch shown in Fig. 3 may be designated as an entirety by the letter B and is shown as comprising a plurality of sheets of corded rubber square in shape. These sheets 14, 15, 16 and 17 are of successively smaller sizes from bottom to top of the patch. Although the patch B may be composed of new corded rubber fabric, preferably for the sake of economy, this patch will be formed from old tire casings. Square cuts will be made in good portions of these old casings, whereupon the edges of the cut out portions will be skived down so that the edges of the different sheets 14, 15, 16 and 17 are bevelled to take the appearance of the edges of the patch shown in Fig. 5. A layer of uncured gum rubber will be applied to the bottom of the patch in the same manner as the layer 13 to the patch A whereupon the patch may be applied in position in the tire casing and vulcanized in place. If the patch B is made from new corded rubber fabric, the different sheets will be applied one on top of each other in superimposed relation, whereupon the patch may be applied to the tire casing and there vulcanized to bind the various sheets together.

In Figs. 4 and 5, a third embodiment of the invention is shown. This patch is designated as an entirety by the letter C and it includes a plurality of circular corded rubber sheets 18, 19, 20 and 21 of successively smaller diameter from bottom to top of the patch. The cords of adjacent sheets of this patch extend in opposite directions as in the patch B and the patch C will preferably be made from the good portions of old tire casing in much the same manner as the patch B. Applied to the bottom of the patch C is a layer 22 of originally uncured gum rubber and this layer will be used for vulcanizing the patch to the casings when it is applied thereto.

It will be understood that the patch C can be made from new rubber corded fabric if desired. When new corded rubber fabric is used for making the patch, preferably a patch of the type shown in Figs. 1 and 2 will be made in order to conserve the new corded rubber fabric. It will be noted by comparing the patch A with the patch B that there is a considerable saving of material in the patch A over the quantity of material used in the patch B. The hexagonal shape of the sheets 7, 8, 9, 10, 11 and 12 conserve the material that would otherwise be used to form two corners of such sheets as the sheets 14, 15, 16 and 17 of the patch B. The triangular corners of a square sheet forming a part of the patch, and containing cords of the shortest length of the cords of the patch, have very little value for taking the strain imposed upon the patch. These corner wings are eliminated in the sheets forming the patch A and the material that would otherwise be used for these wings is saved.

When a tire casing having any one of the described patches applied thereto is in use, all sheets of the patch will equally take the strain imposed upon the patch without overburdening and prematurely destroying any particular sheet of the patch. In the patches B and C illustrated, the edges of sheets overlying the lowermost sheet of the patch, do not project beyond the edges of the lowermost sheet and, as a result, there can be no deformation of the overlying sheets adjacent their edges and all the sheets of the patch act in much the same manner as the leaves of a leaf spring when stress is applied against the spring to contract all the leaves thereof. Each sheet of the patch mutually coacts with the remaining sheets to take its share of the load imposed upon the patch. It will, of course, be apparent that no hinge action will take place between portions of the edges of the different sheets of the patch to wear the patch and tend to loosen the same. Although in the patch A, there are certain portions of the edges of upper sheets of the patch which overlie certain portions of under sheets and project beyond the same, the deformation of the sheets at these portions is so slight that it will not have an appreciable effect on the patch to prevent the stresses and strains to be imposed upon the patch to be received equally by all the sheets forming the patch.

The patches will have long life and may be used to cover larger breaks in tire casings by use of less material than is the case with other patches now on the market. By reason of the fact that less material is used to cover breaks in tire casings of certain size, the balance of a tire having one of the patches of the invention therein, will not be thrown off center to the same extent as a similar tire carrying a patch of different construction installed similarly. Greater resiliency and less tread wear results to a tire casing within which the patch of the invention is installed than in a casing wherein other patches of equal thickness sufficient to repair equal casing injuries are used. By reason of the fact that the lowermost sheet of the patch, i. e. the sheet next to the tire casing, is as large or larger than any other sheet in the patch, the patch is much more adhesive to the tire than patches wherein the bottom surface is broken by being composed of piece-meal sections as in patches wherein the lowermost sheet is the smallest sheet of the patch. As the cords of the lowermost sheet lie flat against the tire casing and they are not distorted throughout the greatest over all length of the patch, the patch may cover a greater area of breakage in the tire casing than in many other patches and there is much less tendency for the patch to bulge than in the patches of different construction, but composed of similar material. By reason of the fact that the patch by use of less material, covers a greater breakage area in the tire casing effectively, there is a saving in labor required for cleaning a smaller area in the tire casing before application of the patch to the casing and there is also a saving in the quantity of cement or rubber gum that is used for securing the patch to the casing.

Patches embodying the invention have been successively demonstrated in actual practice.

It will, of course, be understood that various changes may be made in the form, details, arrangement and proportions of the various parts without departing from the scope of the present invention, which, generally stated, consists in the matter shown and described and set forth in the appended claims.

What is claimed is:—

1. A tire repair patch for tire casings comprising a plurality of sheets of corded rubber applied in overlapping relation one on top of the other, said sheets being shaped to conform in curvature to the curvature of the casing and being vulcanized together, the cords of certain sheets running in opposite directions and certain overlying sheets being of smaller dimension that all sheets underlying the same and no overlying sheets being of greater dimension than all sheets underlying the same, the bottom underlying sheet being adapted to be applied to a tire casing and certain cords in each sheet running throughout the greatest overall length of the sheet and the remaining cords in each sheet running substantially parallel to the respective certain cords.

2. A tire repair patch for tire casings, comprising a plurality of sheets of corded rubber applied in overlying relation one on top of the other, said sheets being vulcanized together, the cords of certain sheets running in opposite directions and certain overlying sheets being of smaller dimension than all sheets underlying the same, the bottom underlying sheet being adapted to be applied to a tire casing and certain cords in each sheet running throughout the greatest overall length of the sheet and the remaining cords in each sheet running substantially parallel to the respective certain cords.

WALTER L. KNAPTON.